United States Patent
Nishizaki

(10) Patent No.: US 7,254,128 B2
(45) Date of Patent: Aug. 7, 2007

(54) CHANNEL DATA EXTRACTING CIRCUIT AND EXTRACTING METHOD

(75) Inventor: Hideki Nishizaki, Tokyo (JP)

(73) Assignee: NEC Corporation, Tokyo (JP)

(*) Notice: Subject to any disclaimer, the term of this patent is extended or adjusted under 35 U.S.C. 154(b) by 1297 days.

(21) Appl. No.: 10/053,873

(22) Filed: Jan. 24, 2002

(65) Prior Publication Data
US 2002/0110117 A1    Aug. 15, 2002

(30) Foreign Application Priority Data
Jan. 25, 2001    (JP)    ............... 2001-017286

(51) Int. Cl.
*H04L 12/66* (2006.01)
*H04L 12/50* (2006.01)

(52) U.S. Cl. .............. 370/354; 370/367; 370/387; 370/388

(58) Field of Classification Search ............... 370/352, 370/354, 355, 522, 907, 386
See application file for complete search history.

(56) References Cited

U.S. PATENT DOCUMENTS

| | | | | |
|---|---|---|---|---|
| 4,782,478 A | * | 11/1988 | Day et al. | 370/356 |
| 4,912,700 A | * | 3/1990 | Maddern et al. | 370/367 |
| 5,119,370 A | * | 6/1992 | Terry | 370/354 |
| 6,389,014 B1 | * | 5/2002 | Song | 370/376 |
| 6,674,753 B1 | * | 1/2004 | Harasaki et al. | 370/378 |
| 7,197,031 B2 | * | 3/2007 | Betts et al. | 370/367 |
| 2002/0031118 A1 | * | 3/2002 | Li et al. | 370/360 |

FOREIGN PATENT DOCUMENTS

| | | |
|---|---|---|
| JP | 2-224547 | 9/1990 |
| JP | 2000-13387 | 1/2000 |
| JP | 2000-354043 | 12/2000 |

OTHER PUBLICATIONS

"ATM Beginner's Guide: Passport to Multimedia Age", Yokogawa Digital Computer Corp., SI Business Division, pp. 47-51, Jul. 1994, with partial English translation.

* cited by examiner

*Primary Examiner*—Chau Nguyen
*Assistant Examiner*—Nittaya Juntima
(74) *Attorney, Agent, or Firm*—McGinn IP Law Group, PLLC

(57) ABSTRACT

A channel data extracting circuit for extracting data for each channel from a frame in which byte data of channels are multiplexed includes a Banyan unit and data control unit. The Banyan unit distributes data for respective channels by Banyan switches of planes corresponding to the channels, and sequentially aligns word data. The data control unit transmits to the Banyan unit a control signal representing a channel to which data belongs, and controls the operations of the Banyan switches. A channel data extracting method is also disclosed.

13 Claims, 7 Drawing Sheets

CHANNEL DATA EXTRACTING CIRCUIT AND EXTRACTING METHOD

BACKGROUND OF THE INVENTION

The present invention relates to a channel data extracting circuit and extracting method for extracting data from a byte-multiplexed frame for each channel in SDH (Synchronous Digital Hierarchy).

Conventional SDH data multiplexing formats include STM (Synchronous Transfer Module)-1 (bit rate: 150 Mbps), STM-4 (600 Mbps), and STM-16 (2.4 Gbps). These multiplexing formats cannot efficiently use a transmission channel in containing packet data such as PPP (Point to Point Protocol).

Virtual concatenation, which is a technique for solving this problem, can assign to an SDH channel an arbitrary band (VC (Virtual Container)-3 (50 Mbps)×n, VC-4 (150 Mbps)×n). For example, in STM-16, 48 VC-3 are multiplexed, and the channel band can be set with intervals of 50 Mbps from VC-3×1 (50 Mbps) to VC-3×48 (2.4 Gbps) by virtual concatenation.

Arbitrarily setting a channel band enables efficient use of the channel such that the band utilization factor is 66% in mapping using VC-4, but 100% in mapping using two channels of VC-3 when 100-Mbps Ethernet data is contained in SDH.

SDH is constituted by sequentially multiplexing the payload bytes of a frame. In general, an n→1 selector is used to extract data from a byte-multiplexed frame for each channel or for each channel by virtual concatenation. However, if the channel data extracting circuit for extracting data for each channel is formed using the n→1 selector, the hardware becomes bulky.

SUMMARY OF THE INVENTION

It is an object of the present invention to provide a channel data extracting circuit and extracting method capable of extracting data from a byte-multiplexed frame for each channel without increasing the hardware scale.

To achieve the above object, according to the present invention, there is provided a channel data extracting circuit for extracting data for each channel from a frame in which byte data of channels are multiplexed, comprising Banyan means for distributing data for respective channels by Banyan switches of planes corresponding to the channels and sequentially aligning word data, and data control means for transmitting to the Banyan means a control signal representing a channel to which data belongs and controlling operations of the Banyan switches.

DESCRIPTION OF THE PREFERRED EMBODIMENTS

Preferred embodiments of the present invention will be described in detail below with reference to the accompanying drawings.

First Embodiment

As an application of a channel data extracting circuit according to the present invention, an STM/Packet hybrid switch for performing switching processing between the module of an STM format (to be referred to as an STM frame hereinafter) as an SDH multiplexing format, and a packet based on PPP (Power to Point Protocol) or the like will be described with reference to FIG. 1.

Figure 1:
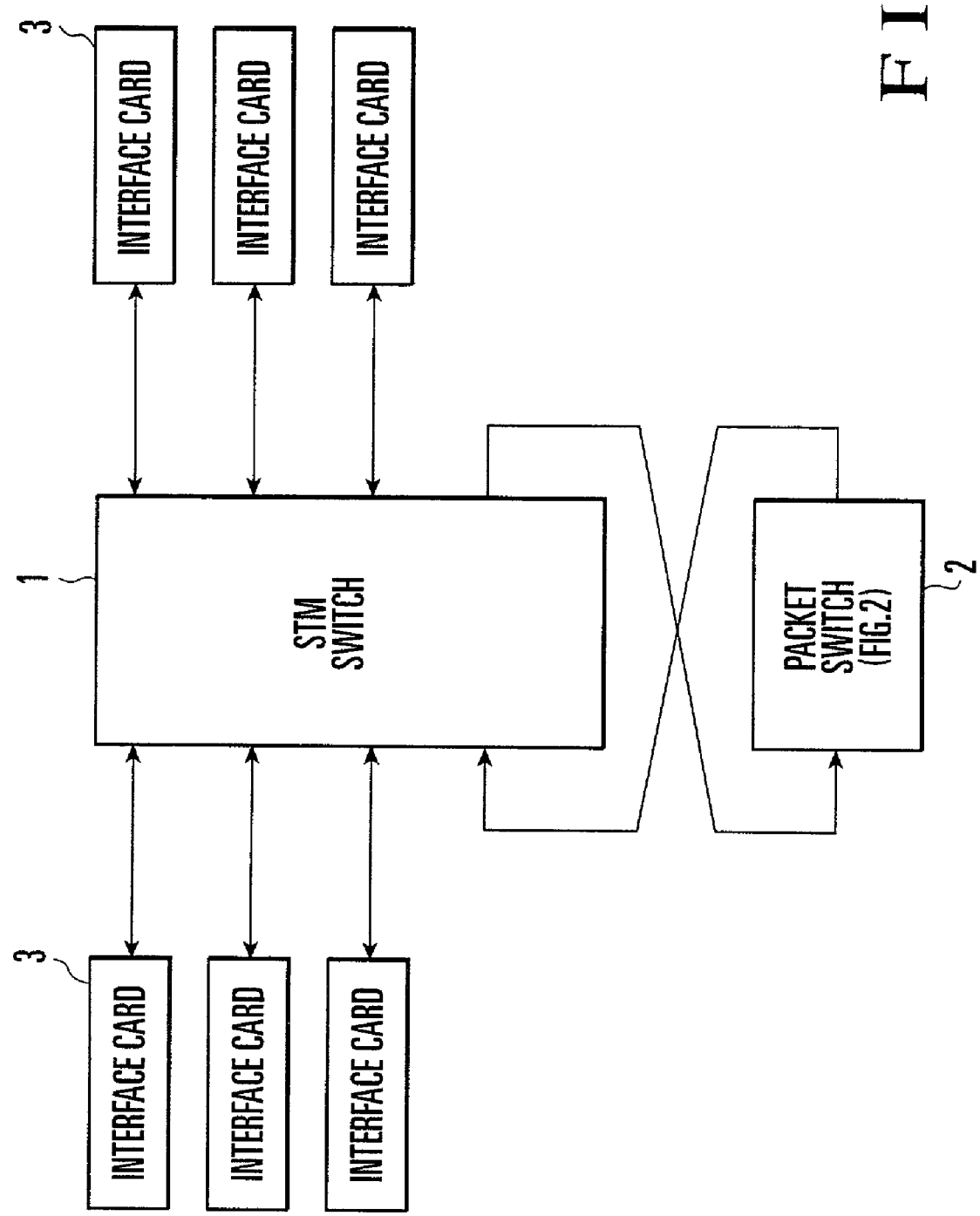
FIG. 1 is a block diagram showing an example of an STM/Packet hybrid switch to which the present invention is applied.

As shown in FIG. 1, the STM/Packet hybrid switch comprises an STM switch 1 for performing switching processing of an STM frame, a packet switch 2 for fragmenting an STM frame received from the STM switch 1 into channels, extracting packets, and then performing switching processing for each packet, and a plurality of interface cards 3 for performing interface operation between the outside of the apparatus and the STM switch 1.

The interface cards 3 include an STM interface card for containing data of an STM format, a PoS interface card for containing data of PoS (Packet over Sonet), and an Ethernet interface card for containing data of an Ethernet format.

In FIG. 1, three interface cards 3 are arranged on each of the input and output sides. However, the interface card 3 is attached to each I/O port of the STM switch 1, and the number of interface cards 3 is not limited to three.

When the STM/Packet hybrid switch shown in FIG. 1 is to operate as an STM switch in this arrangement, an STM frame input to the input-side interface card 3 is output to an output-side interface card 3 corresponding to a transmission destination via the STM switch 1.

When the STM/Packet hybrid switch shown in FIG. 1 is to operate as a packet switch, an STM frame input to the input-side interface card 3 is transferred from the STM switch 1 to the packet switch 2. The packet switch 2 fragments the STM frame into channels and executes switching processing for each packet. The packets having undergone switching processing are constructed into an STM frame again, input to the STM switch 1, and output to an interface card 3 corresponding to a transmission destination.

Figure 2:
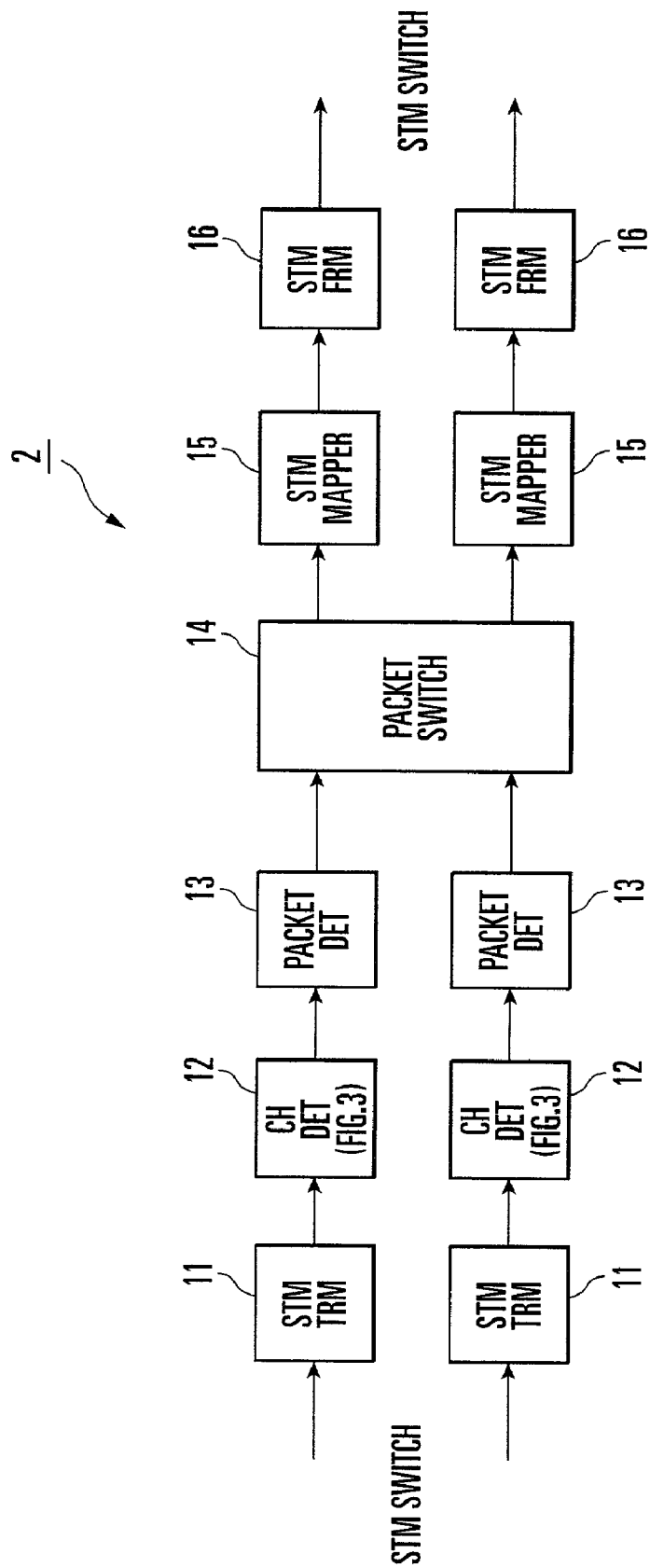
FIG. 2 is a block diagram showing a packet switch shown in FIG. 1.

The packet switch 2 will be explained in detail with reference to FIG. 2. As shown in FIG. 2, the packet switch 2 comprises STM terminating units (STM TRM) 11 for performing terminating processing of STM frames output from the STM switch 1, channel data extracting circuits (CH DET) 12 for distributing data of byte-multiplexed STM frames for the respective channels, packet detecting units (Packet DET) 13 for extracting packets from the channel data distributed for the respective channels, a packet switching unit (Packet switch) 14 for performing switching processing of the packets extracted by the packet detecting units 13, STM mapping units (STM Mapper) 15 for distributing the packets output from the packet switching unit 14 to corresponding TSs (Time Slot) of STM frames, and STM framer units (STM FRM) 16 which reassemble STM frames from the packets distributed by the STM mapping units 15 and serve as interfaces with the STM switch 1.

FIG. 2 shows an arrangement for containing STM frames of two ports, but the number of ports in the packet switch 2 is not limited to two. The STM terminating units 11, channel data extracting circuits 12, packet detecting units 13, STM mapping units 15, and STM framer units 16 are arranged in correspondence with the respective I/O ports of the packet switching unit 14.

The operation of the STM/Packet hybrid switch having this arrangement will be explained. An STM frame output from the STM switch 1 is received by the STM terminating unit 11 of the packet switch 2 and subjected to terminating processing. Output data from the STM terminating unit 11 is distributed by the channel data extracting circuit 12 for the respective channels (or in units of virtual concatenations), and the packets of each channel are extracted by the packet detecting unit 13.

The packets extracted by the packet detecting unit 13 are switched to ports corresponding to their transmission destinations by the packet switching unit 14. Data of respective channels output from the packet switching unit 14 are mapped into an STM format by the STM mapping unit 15, and reassembled into an STM frame by the STM framer unit 16. The resultant STM frame is output to the STM switch 1.

Figure 3:
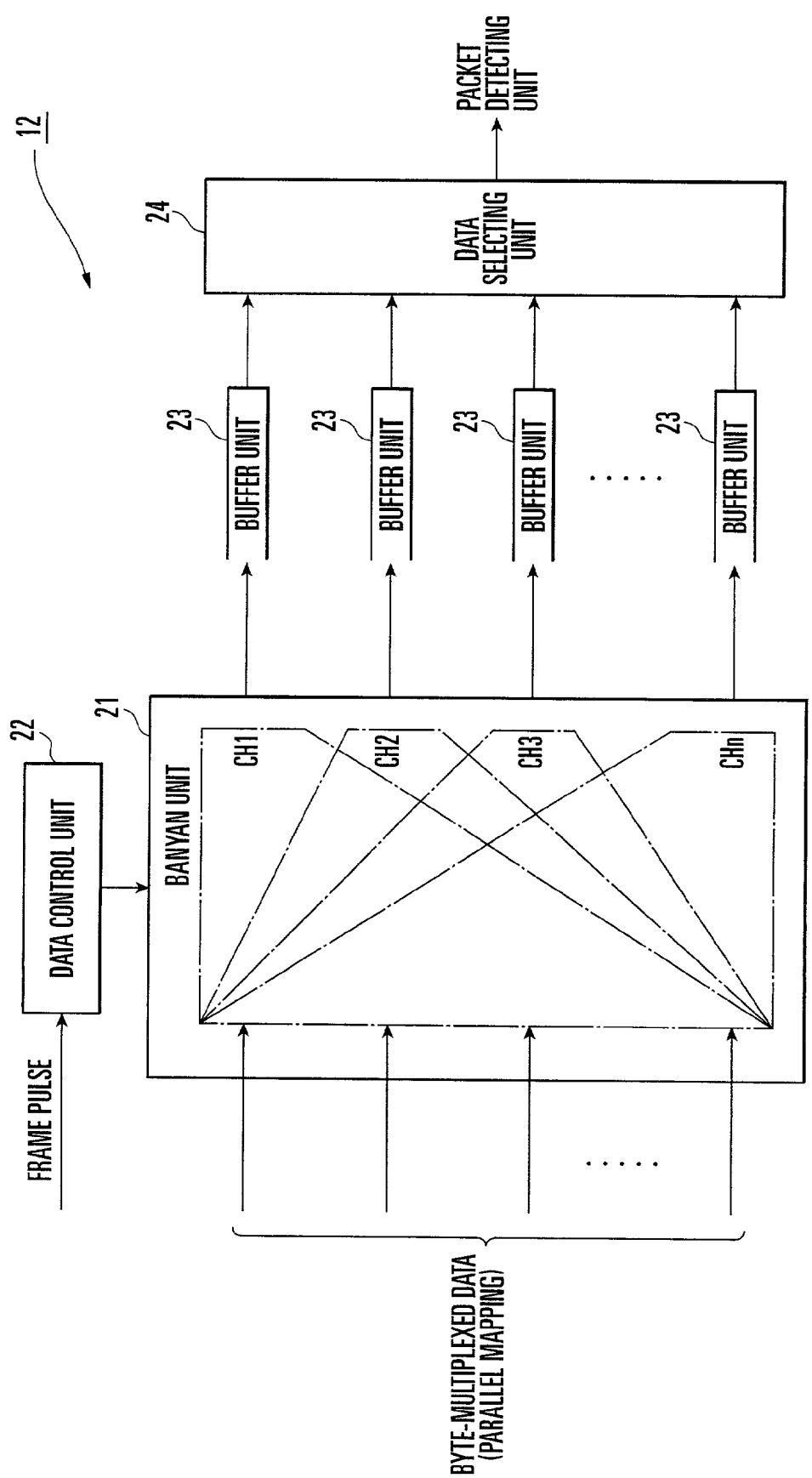
FIG. 3 is a block diagram showing a channel data extracting circuit shown in FIG. 2 according to the first embodiment of the present invention.

The channel data extracting circuit 12 according to the first embodiment of the present invention will be described in detail with reference to FIG. 3. As shown in FIG. 3, the channel data extracting circuit 12 comprises a Banyan unit 21 for distributing byte-multiplexed input data for the respective channels, a data control unit 22 for controlling input data distribution processing of the Banyan unit 21, a plurality of buffer units 23 for holding data of respective channels output from the Banyan unit 21, and a data selecting unit 24 for sequentially reading out the data held by the buffer units 23 and outputting them.

If an STM frame contained in the STM/Packet hybrid switch shown in FIG. 1 has a high-speed band (e.g., 2.4 Gbps), the channel data extracting circuit 12 receives word data whose speed is converted into a low one by parallel conversion (e.g., 38 Mbps×8 bytes parallel).

The data control unit 22 receives a frame pulse representing the start of a frame signal at the same time as input of the word data to the Banyan unit 21. By using the frame pulse as a reference, the data control unit 22 manages a channel to which byte data of a given TS (Time Slot) belongs, and controls input data distribution processing of the Banyan unit 21 for each byte.

The Banyan unit 21 is constituted by n-plane Banyan switches (to be described later), and each plane corresponds to a channel or a channel defined by virtual concatenation. The Banyan switches are made up of a plurality of 2×2 switches, extract channel data fragmented into a plurality of TSs (Time Slots) for each channel, and sequentially align the data.

When the Banyan unit 21 receives parallel-converted data, it causes the Banyan switches arranged for respective channels to execute switching processing in accordance with a control signal that is transmitted by the data control unit 22 and represents a channel to which each byte data belongs. In this case, each Banyan switch sets byte data belonging to its own channel to valid byte data, and byte data belonging to another channel to invalid byte data. The Banyan switch performs switching processing by using only byte data belonging to its own channel as valid byte data.

The outputs of the Banyan switches have temporary accumulation buffers (to be described later) for performing first-in first-out operation. Byte data of respective channels having undergone virtual concatenation are sequentially accumulated in the temporary accumulation buffers. Output data from the temporary accumulation buffers are held by the buffer units 23, sequentially read out by the data selecting unit 24, and output to the subsequent packet detecting unit 13.

The arrangement of one plane of the Banyan switch in the Banyan unit shown in FIG. 3 will be explained with reference to FIG. 4. In the Banyan switch shown in FIG. 4, 8-byte parallel data are input/output.

Figure 4:
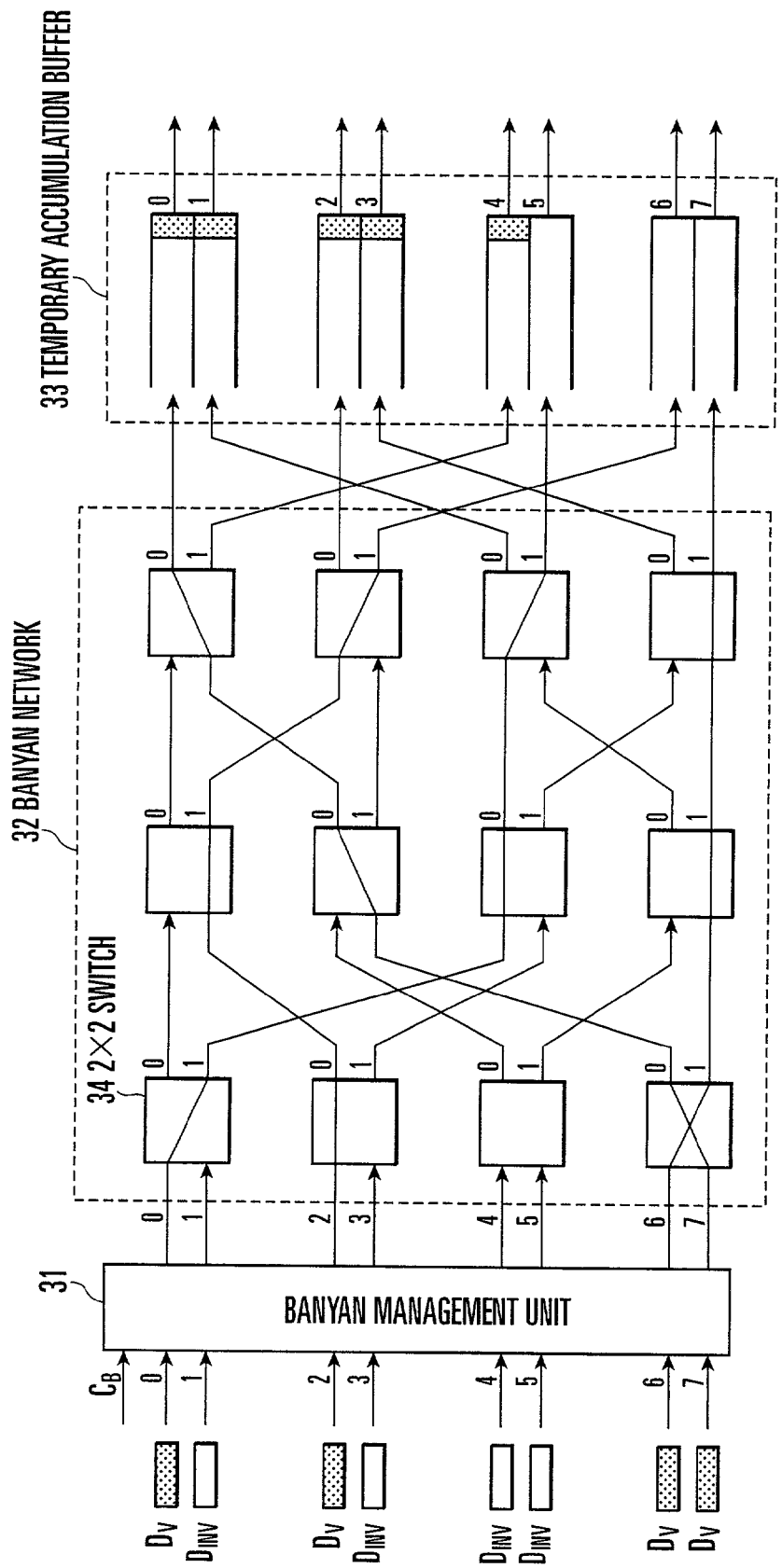
FIG. 4 is a block diagram showing an arrangement of one plane of a Banyan switch in a Banyan unit shown in FIG. 3.

As shown in FIG. 4, the Banyan switch has a Banyan management unit 31 for controlling the transmission destination of byte data, a Banyan network 32 comprised of a plurality of multistage-connected 2×2 switches 34, and a plurality of temporary accumulation buffers 33 for temporarily accumulating valid byte data after switching processing. In FIG. 4, the Banyan network 32 is constituted by connecting three stages of four 2×2 switches 34. The structure of the Banyan network 32 is not limited to this, and may be constituted by multistage-connecting a larger number of 2×2 switches 34.

The temporary accumulation buffers 33 are formed from a plurality of buffers for temporarily accumulating byte data output from the Banyan network 32, and arranged for respective bytes. In the example of FIG. 4, the temporary accumulation buffers 33 are constituted by eight buffers corresponding to outputs "0" to "7" because of 8 output bytes. The Banyan network 32 transmits input byte data to a corresponding buffer of the temporary accumulation buffer 33 via a root determined by the Banyan management unit 31.

The Banyan management unit 31 determines a temporary accumulation buffer 33 serving as the transmission destination of valid byte data $D_V$ on the basis of a control signal $C_B$ representing a channel to which each byte data transmitted from the data control unit 22 belongs.

In the example shown in FIG. 4, outputs "0" to "4" of the temporary accumulation buffers 33 have already held valid byte data $D_V$. Valid byte data $D_V$ input to the top position (input "0" in FIG. 4) of the Banyan management unit 31 is assigned to output "5" of the temporary accumulation buffer 33. Similarly, valid byte data $D_V$ to input "2" is assigned to output "6"; valid byte data $D_V$ to input "6", to output "7"; and valid byte data $D_V$ to input "7", to output "7". Invalid byte data $D_{INV}$ to inputs "3" to "5" are discarded by the Banyan management unit 31 without being transmitted to the temporary accumulation buffer 33.

Word data (bytes) at outputs "0" to "7" fragmented into channels are simultaneously read out at a predetermined timing, sequentially aligned, and output.

Referring back to FIG. 3, word data of respective channels output from the Banyan unit 21 are held by the buffer units 23, and sequentially output to the subsequent packet detecting unit 13 via the data selecting unit 24.

Note that the Banyan network 32 does not cause internal blocking as far as input data are sequentially sorted like packets inserted into an STM frame, as described in "ATM Beginner's Guide: Passport to Multimedia Age", Yokogawa Digital Computer Corp., SI Business Division, pp. 47-51, July 1994.

Figure 5:
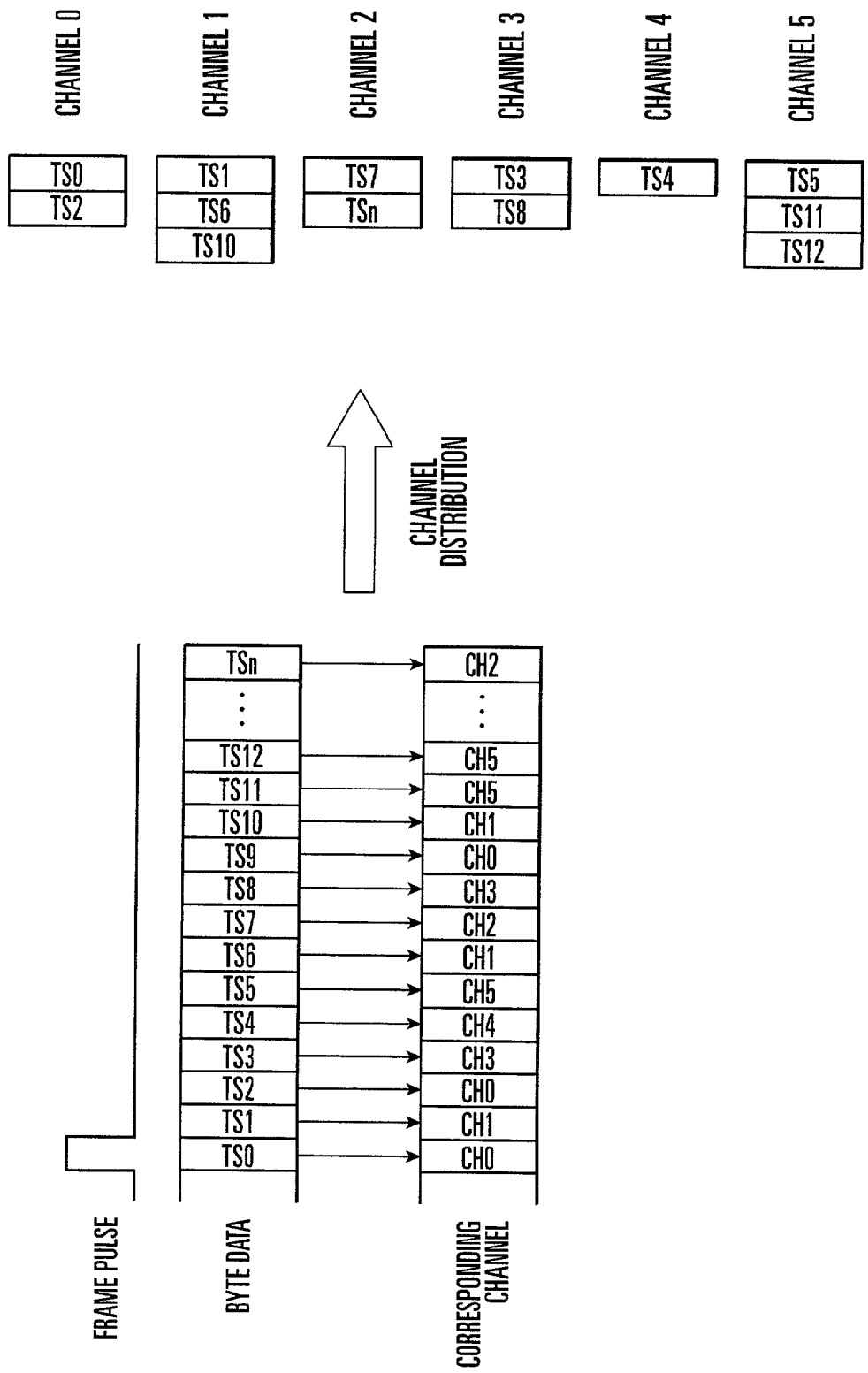
FIG. 5 is a schematic view showing a state in which byte-multiplexed data input to the channel data extracting circuit shown in FIG. 3 are distributed for the respective channels.

FIG. 5 shows a state in which byte-multiplexed data input to the channel data extracting circuit 12 are distributed for the respective channels. As shown in FIG. 5, byte data TS0 to TSn input in response to a frame pulse serving as a reference are assigned their channel information, and distributed for the respective channels by the channel data extracting circuit 12.

By using Banyan switches of planes corresponding to channels, data are extracted for each channel and sequentially aligned as word data (byte data). Even data as a combination of arbitrary channels by virtual concatenation can undergo switching processing. In particular, the Banyan network is adopted for word data alignment processing, so that the channel data extracting circuit can easily cope with virtual concatenation using a combination of any TSs, and can suppress an increase in circuit scale.

Second Embodiment

Figure 6:
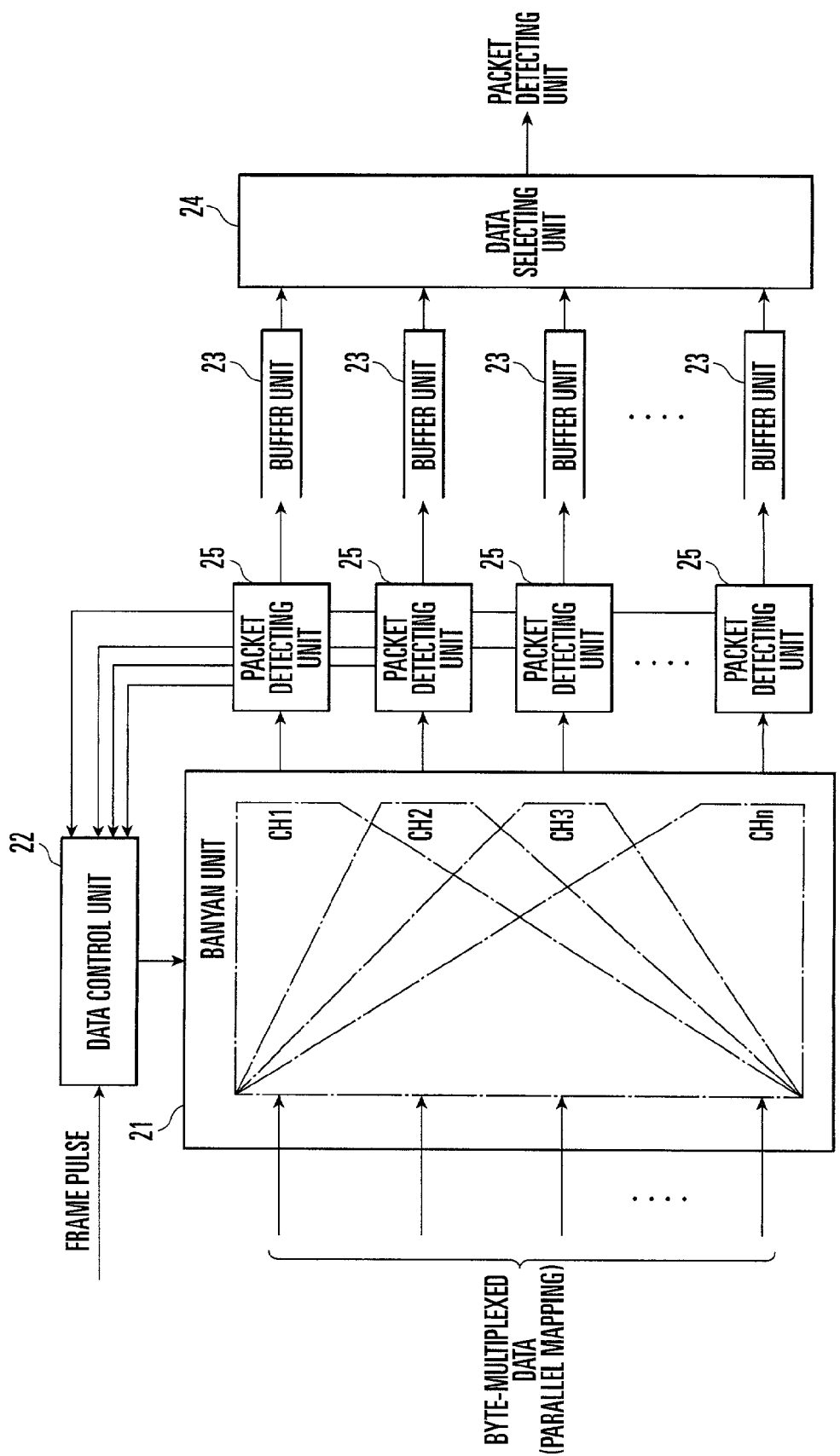
FIG. 6 is a block diagram showing a channel data extracting circuit according to the second embodiment of the present invention.

FIG. 6 shows a channel data extracting circuit according to the second embodiment of the present invention. The channel data extracting circuit of the second embodiment is different from that of the first embodiment in that packet detecting units 25 are interposed between a Banyan unit 21 and buffer units 23. As for the remaining arrangement, the same reference numerals as in the first embodiment denote the same parts, and a description thereof will be omitted.

Each packet detecting unit 25 analyzes word data distributed for the respective channels by the Banyan unit 21, detects the boundary of a packet, and transmits to a data control unit 22 information (e.g., packet length information) representing the boundary of the next packet.

Accordingly, the data control unit 22 can recognize start byte data of a packet for each channel. The data control unit 22 outputs a signal representing the start byte data of the packet to the Banyan unit 21, and controls the Banyan unit 21 so as to output the corresponding byte data at the start of word data, as shown in FIG. 7.

Figure 7:
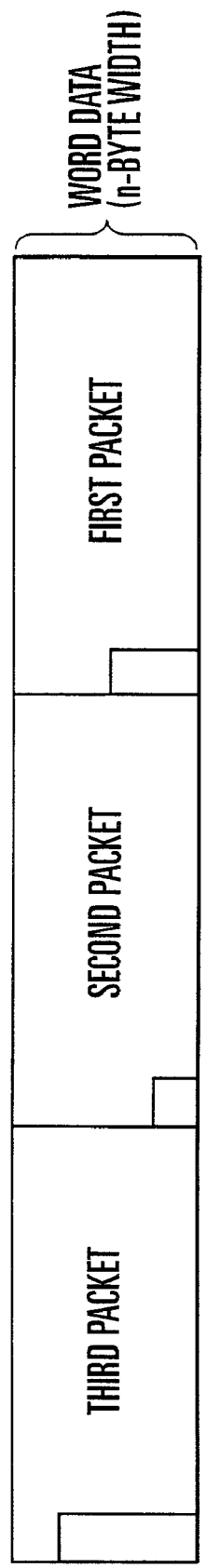
FIG. 7 is a schematic view showing the structure of word data output from a Banyan unit shown in FIG. 6.

As shown in FIG. 7, in the second embodiment, idle data is inserted after the final byte of a packet, and byte data at the start of the packet is always positioned at the start of word data. This facilitates subsequent processing. In performing this processing, idle data is inserted after the final word of a packet. For this purpose, the write speed to the buffer unit must be set higher than the input data speed.

As has been described above, the present invention achieves the following effects.

Banyan switches of planes corresponding to channels are employed. Data are extracted in units of channels by the Banyan switches, and sequentially aligned in units of words. Even data as a combination of arbitrary channels by virtual concatenation can undergo switching processing.

Especially, the Banyan network is adopted for data alignment processing in units of words. The channel data extracting circuit can easily cope with virtual concatenation using a combination of any time slots, and can suppress an increase in circuit scale.

Data extracted for each channel is analyzed to detect the boundary of a packet inserted into a frame. A control signal representing whether data is start data of the packet is generated based on the boundary of the packet. Start data is output in accordance with the control signal so as to be positioned at the start of word data which constitutes the packet. Start byte data of a packet is always positioned at the start of word data, which facilitates subsequent processing.

What is claimed is:

1. A channel data extracting circuit for extracting data for each channel from a frame in which byte data of channels are multiplexed, comprising:
   Banyan means for distributing data for respective channels by Banyan switches of planes corresponding to the channels and sequentially aligning word data; and
   data control means for transmitting to said Banyan means a control signal representing a channel to which data belongs and controlling operations of the Banyan switches.

2. A circuit according to claim 1, wherein the Banyan switches have a plurality of multistage-connected 2×2 switches.

3. A circuit according to claim 1, wherein each of the Banyan switch sets data belonging to an own channel to valid data and sequentially aligns only valid data, and data belonging to another channel to invalid data.

4. A circuit according to claim 1, wherein
   said channel data extracting circuit further comprises packet detecting means for analyzing data extracted for each channel to detect a boundary of a packet inserted into a frame,
   said data control means outputs a control signal representing whether data is start data of a packet, to said Banyan means on the basis of the boundary of the packet detected by said packet detecting means, and
   said Banyan means outputs, in accordance with the control signal from said data control means, start data so as to be positioned at a start of word data which constitutes a packet.

5. A circuit according to claim 4, wherein said Banyan means inserts idle data after final data of a packet so as to position start data of the packet at a start of word data.

6. A circuit according to claim 1, further comprising:
   buffer means for holding data of respective channels output from said Banyan means; and
   data selecting means for sequentially reading out and outputting the data held by said buffer means.

7. An STM/Packet hybrid switch comprising:
   an STM switch for performing switching processing of an STM frame; and
   a packet switch having a channel data extracting circuit for extracting data of respective channels from a frame in which byte data of channels are multiplexed, said packet switch having a Banyan unit for distributing data for respective channels by Banyan switches of planes corresponding to the channels and sequentially aligning word data, and a data control unit for transmitting to the Banyan unit a control signal representing a channel to which data belongs and controlling operations of the Banyan switches,
   wherein said Banyan switches comprise 2×2 switches fragment for respective channels an STM frame received from said STM switch, and then performs switching processing for each packet.

8. A channel data extracting method of extracting data for each channel from a frame in which byte data of channels are multiplexed, comprising:
   generating a control signal representing a channel to which data belongs; and
   distributing data for respective channels by Banyan switches of planes corresponding to the channels in accordance with the generated control signal, and sequentially aligning word data.

9. A method according to claim 8, wherein the Banyan switches have a plurality of multistage-connected 2×2 switches.

10. A method according to claim 8, wherein said distributing comprises:
    setting data belonging to an own channel to valid data;
    setting data belonging to another channel to invalid data; and
    sequentially aligning only valid data by the Banyan switches.

11. A method according to claim 8, further comprising:
    analyzing data extracted for respective channels to detect a boundary of a packet inserted into a frame,
    generating based on the detected boundary of the packet a control signal representing whether data is start data of a packet; and outputting, in accordance with the generated control signal, start data so as to be positioned at a start of word data which constitutes a packet.

12. A method according to claim 11, further comprising inserting idle data after final data of a packet so as to position start data of the packet at a start of word data.

13. A method according to claim 8, further comprising:
holding data aligned for respective channels; and
sequentially reading out and outputting the held data.

* * * * *